(12) United States Patent
Mizutani

(10) Patent No.: US 11,513,347 B2
(45) Date of Patent: Nov. 29, 2022

(54) LASER SCANNING UNIT, IMAGE FORMING APPARATUS, LASER SCANNING METHOD, AND NON-TRANSITORY STORAGE MEDIUM

(71) Applicant: KYOCERA Document Solutions Inc., Osaka (JP)

(72) Inventor: Hideji Mizutani, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/411,363

(22) Filed: Aug. 25, 2021

(65) Prior Publication Data

US 2022/0066201 A1 Mar. 3, 2022

(30) Foreign Application Priority Data

Aug. 28, 2020 (JP) ............................. JP2020-144334

(51) Int. Cl.
| | | |
|---|---|---|
| G03G 15/01 | (2006.01) | |
| G03G 15/04 | (2006.01) | |
| G02B 26/10 | (2006.01) | |
| G02B 27/00 | (2006.01) | |
| G03G 15/043 | (2006.01) | |

(52) U.S. Cl.
CPC ......... *G02B 27/0068* (2013.01); *G02B 26/10* (2013.01); *G03G 15/043* (2013.01); *G03G 2215/0158* (2013.01)

(58) Field of Classification Search
CPC ............ G03G 15/043; G03G 15/0435; G03G 15/5054; G03G 15/5058; G03G 2215/0158; G02B 7/198; G02B 26/10; G02B 27/0068; G02B 26/127
See application file for complete search history.

(56) References Cited

U.S. PATENT DOCUMENTS

| | | | | |
|---|---|---|---|---|
| 2009/0009836 A1* | 1/2009 | Narita | ................. | G02B 26/125 359/201.1 |
| 2009/0009840 A1* | 1/2009 | Shoji | .................... | G02B 26/126 359/205.1 |

(Continued)

FOREIGN PATENT DOCUMENTS

JP 2004170755 A 6/2004

*Primary Examiner* — Sophia S Chen
(74) *Attorney, Agent, or Firm* — Alleman Hall Creasman & Tuttle LLP

(57) ABSTRACT

A laser scanning unit includes a light source portion, a scanning portion, a first correction portion, and a second correction portion. The light source portion outputs a plurality of light beams. The scanning portion scans the plurality of light beams to form a plurality of electrostatic latent images, respectively corresponding to a plurality of colors including at least one reference color and at least one non-reference color, in an image forming portion. The first correction portion applies an external mechanical force to an optical element located in a path of a reference beam, corresponding to the reference color, among the plurality of light beams to correct distortion of a scan line of the reference beam. The second correction portion controls the light source portion to correct distortion of a scan line of a non-reference beam, corresponding to the non-reference color, among the plurality of light beams.

9 Claims, 11 Drawing Sheets

(56) References Cited

U.S. PATENT DOCUMENTS

| | | | |
|---|---|---|---|
| 2015/0261120 A1* | 9/2015 | Fujii | G03G 15/0435 347/133 |
| 2017/0214818 A1* | 7/2017 | Hamanaka | H04N 1/0432 |
| 2021/0286290 A1* | 9/2021 | Nishiguchi | G03G 15/0435 |

* cited by examiner

LASER SCANNING UNIT, IMAGE FORMING APPARATUS, LASER SCANNING METHOD, AND NON-TRANSITORY STORAGE MEDIUM

INCORPORATION BY REFERENCE

This application is based upon and claims the benefit of priority from the corresponding Japanese Patent Application No. 2020-144334 filed on Aug. 28, 2020, the entire contents of which are incorporated herein by reference.

The present disclosure relates to a laser scanning unit, an image forming apparatus, a laser scanning method, and a non-transitory storage medium.

BACKGROUND

As a related art, there is known an electrophotographic image forming apparatus of a tandem type that includes a plurality of image forming units and that transfers images of different colors in sequence onto a recording material held on a conveyor belt. A laser scanning unit (deflection scanning device) of the image forming apparatus according to the related art can electrically correct inclination of scan lines relative to the main scanning direction and distortion, such as curves, of the scan lines. That is, the related art prevents misregistration of a plurality of images after transfer by detecting the inclination, distortion, and the like and emitting light beams (light rays) by amounts and at timings that enable correction of the detected inclination, distortion, and the like.

SUMMARY

A laser scanning unit according to an aspect of the present disclosure includes a light source portion, a scanning portion, a first correction portion, and a second correction portion. The light source portion outputs a plurality of light beams. The scanning portion scans the plurality of light beams to form a plurality of electrostatic latent images, respectively corresponding to a plurality of colors including at least one reference color and at least one non-reference color, in an image forming portion. The first correction portion applies an external mechanical force to an optical element located in a path of a reference beam, corresponding to the reference color, among the plurality of light beams to correct distortion of a scan line of the reference beam. The second correction portion controls the light source portion to correct distortion of a scan line of a non-reference beam, corresponding to the non-reference color, among the plurality of light beams.

An image forming apparatus according to another aspect of the present disclosure includes the laser scanning unit and image-carrying members on which the electrostatic latent images are formed by the light beams output from the laser scanning unit.

A laser scanning method according to yet another aspect of the present disclosure includes outputting a plurality of light beams from a light source portion; scanning the plurality of light beams to form a plurality of electrostatic latent images, respectively corresponding to a plurality of colors including at least one reference color and at least one non-reference color, in an image forming portion; applying an external mechanical force to an optical element located in a path of a reference beam, corresponding to the reference color, among the plurality of light beams to correct distortion of a scan line of the reference beam; and controlling the light source portion to correct distortion of a scan line of a non-reference beam, corresponding to the non-reference color, among the plurality of light beams.

A non-transitory storage medium according to yet another aspect of the present disclosure is a non-transitory computer-readable storage medium storing a program therein, wherein when executed by at least one processor, the program causes the processor to output a plurality of light beams from a light source portion; scan the plurality of light beams to form a plurality of electrostatic latent images, respectively corresponding to a plurality of colors including at least one reference color and at least one non-reference color, in an image forming portion; apply an external mechanical force to an optical element located in a path of a reference beam, corresponding to the reference color, among the plurality of light beams to correct distortion of a scan line of the reference beam; and control the light source portion to correct distortion of a scan line of a non-reference beam, corresponding to the non-reference color, among the plurality of light beams.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes embodiments of the present disclosure with reference to the accompanying drawings. It should be noted that the following embodiments are examples of specific embodiments of the present disclosure and should not limit the technical scope of the present disclosure.

Embodiment 1

[1] Overall Configuration of Image Forming Apparatus

First, the overall configuration of an image forming apparatus 10 according to the present embodiment will be described with reference to FIG. 1.

Figure 1:
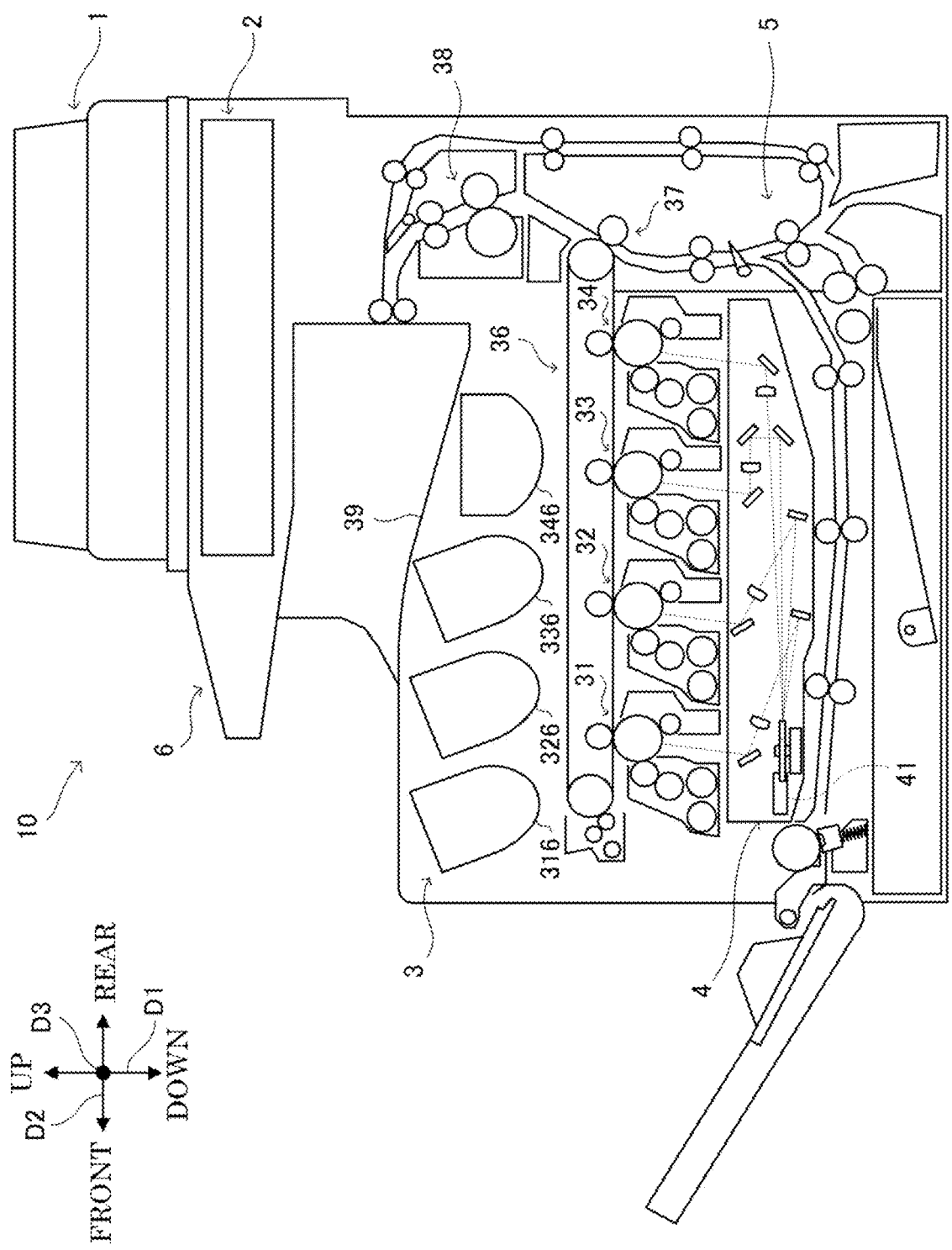
FIG. 1 is a schematic diagram of an image forming apparatus according to Embodiment 1.

For purposes of illustration, the vertical direction in a state where the image forming apparatus 10 is installed and ready for use (as shown in FIG. 1) is defined as an up-down direction D1. In addition, a front-rear direction D2 is defined provided that the left face, on the page, of the image forming apparatus 10 shown in FIG. 1 serves as the front (front face). In addition, a left-right direction D3 is defined relative to the front of the image forming apparatus 10 in the installed state.

As an example, the image forming apparatus 10 according to the present embodiment is a multifunction peripheral with multiple functions such as a scan function of reading image data from document sheets, a print function of forming images based on image data, a facsimile function, and a copy function. The image forming apparatus 10 may be any apparatus having the image forming function, including a printer, a facsimile apparatus, and a copier.

As shown in FIG. 1, the image forming apparatus 10 includes an automatic document feeder 1, an image reading portion 2, an image forming portion 3, a laser scanning unit 4, a sheet feed portion 5, and an operation display portion 6. In other words, the laser scanning unit 4 according to the present embodiment constitutes the image forming apparatus 10 together with the image forming portion 3 and the like. Hereinafter, the automatic document feeder 1 is referred to as "ADF 1" by its acronym.

The ADF 1 feeds a document sheet with an image to be read by the image reading portion 2. The ADF 1 includes a document sheet set portion, a plurality of conveying rollers, a document sheet holder, and a sheet discharge portion.

The image reading portion 2 reads the image from the document sheet and outputs image data corresponding to the read image. The image reading portion 2 includes a document sheet table, a light source, a plurality of mirrors, an optical lens, and a CCD (Charge Coupled Device).

The image forming portion 3 forms a color or monochrome image on a sheet by an electrophotographic method to implement the print function. The image forming portion 3 forms the image on the sheet based on the image data output from the image reading portion 2. In addition, the image forming portion 3 forms the image on the sheet based on image data input by an information processing apparatus, such as a personal computer, outside the image forming apparatus 10.

The sheet feed portion 5 supplies the sheet to the image forming portion 3. The sheet feed portion 5 includes a sheet feed cassette, a manual feed tray, a sheet conveyance path, and a plurality of conveying rollers. The image forming portion 3 forms the image on the sheet supplied by the sheet feed portion 5.

The operation display portion 6 is a user interface in the image forming apparatus 10. The operation display portion 6 includes a display portion and an operation portion. The display portion includes a liquid crystal display and displays various information according to control instructions from an integrated control portion 7 (see FIG. 4). The operation portion includes a switch and a touch panel for inputting the various information to the integrated control portion 7 according to user operations.

The image forming apparatus 10 further includes the integrated control portion 7, a storage portion, and a communication portion. The integrated control portion 7 provides integrated control of the image forming apparatus 10. The integrated control portion 7 is mainly composed of a computer system including one or more processors and one or more memories. In the image forming apparatus 10, the one or more processors execute programs to implement the function of the integrated control portion 7. The programs may be stored in the memories in advance, provided through telecommunication lines such as the Internet, or stored and provided in a non-transitory computer-readable storage medium such as a memory card or an optical disk. The storage portion includes one or more nonvolatile memories and stores in advance information including control programs to cause the integrated control portion 7 to perform various processes. The communication portion is an interface that performs data communication between the image forming apparatus 10 and, for example, an external apparatus connected via a communication network such as the Internet and a LAN (Local Area Network).

[2] Configuration of Image Forming Portion

Next, the configuration of the image forming portion 3 will be described in more detail with reference to FIGS. 1 and 2.

As shown in FIG. 1, the image forming portion 3 includes four image forming units 31 to 34, an intermediate transfer device 36, a secondary transfer roller 37, a fixing device 38, and a sheet discharge tray 39.

The image forming unit 31 forms a toner image of yellow (Y). As shown in FIG. 2, the image forming unit 31 includes a photoconductor drum 311, a charging roller 312, a developing device 313 including a developing roller 313A, a primary transfer roller 314, and a drum cleaning member 315. The image forming unit 31 further includes a toner container 316 (see FIG. 1).

The image forming unit 32 forms a toner image of cyan (C). As shown in FIG. 2, the image forming unit 32 includes a photoconductor drum 321, a charging roller 322, a developing device 323 including a developing roller 323A, a primary transfer roller 324, and a drum cleaning member 325. The image forming unit 32 further includes a toner container 326 (see FIG. 1).

The image forming unit 33 forms a toner image of magenta (M). As shown in FIG. 2, the image forming unit 33 includes a photoconductor drum 331, a charging roller 332, a developing device 333 including a developing roller 333A, a primary transfer roller 334, and a drum cleaning member 335. The image forming unit 33 further includes a toner container 336 (see FIG. 1).

The image forming unit 34 forms a toner image of black (Bk). As shown in FIG. 2, the image forming unit 34 includes a photoconductor drum 341, a charging roller 342, a developing device 343 including a developing roller 343A, a primary transfer roller 344, and a drum cleaning member 345. The image forming unit 34 further includes a toner container 346 (see FIG. 1).

As described above, the plurality (herein four) of image forming units 31 to 34 respectively correspond to the four colors of yellow (Y), cyan (C), magenta (M), and black (Bk), and basically share a common structure. That is, the image forming apparatus 10 according to the present embodiment is an apparatus of a tandem type including a plurality of photoconductors (photoconductor drums) corresponding one-to-one with a plurality of colors. Accordingly, unless otherwise noted, the configurations of the image forming units 31 to 33 are identical to the configuration of the image forming unit 34 described below.

An electrostatic latent image is formed on the photoconductor drum 341. The photoconductor drum 341, the charging roller 342, and the drum cleaning member 345 are stored in a unit housing. The photoconductor drum 341 is supported by the unit housing to be rotatable around a rotational axis extending in the left-right direction D3. The photoconductor drum 341 is subjected to a driving force supplied by, for example, a motor and rotates in a rotation direction D5 shown in FIG. 2.

The charging roller 342 positively charges the surface (outer peripheral surface) of the photoconductor drum 341. Specifically, the charging roller 342 is electrically connected to a power circuit and charges the surface of the photoconductor drum 341 when subjected to high voltage (high-tension voltage) applied by the power circuit. It is noted that the charging roller 342 may charge the surface of the photoconductor drum 341 negatively instead of charging the surface positively.

The surface of the photoconductor drum 341 charged by the charging roller 342 is exposed to a light beam B4 (see FIG. 3) based on the image data emitted by the laser scanning unit 4. This forms an electrostatic latent image on the surface of the photoconductor drum 341. That is, in the present embodiment, the photoconductor drum 341 is an example of an "image-carrying member" on which the electrostatic latent image is formed by the light beam B4 output from the laser scanning unit 4.

The developing device 343 develops the electrostatic latent image formed on the surface of the photoconductor drum 341. For example, the developing device 343 includes a case, a pair of stirring members, a magnet roller, and the developing roller 343A. The pair of stirring members, the magnet roller, and the developing roller 343A are supported by the case to be rotatable around respective rotational axes extending in the left-right direction D3. In addition, the case stores the toner of black (Bk) and carrier. The pair of stirring members stir the toner and the carrier stored in the case so that the toner is charged. In the present embodiment, the toner is charged positively. It is noted that the polarity of the toner is not limited to positive and may be negative. The magnet roller draws up the toner and the carrier stirred by the pair of stirring members and supplies only the toner to the surface (outer peripheral surface) of the developing roller 343A.

The developing roller 343A develops the electrostatic latent image formed on the photoconductor drum 341 using the charged toner. Specifically, a high-voltage developing bias is applied between the developing roller 343A and the photoconductor drum 341 by the power circuit such that a development field is created. The development field causes the toner with electric charges to move from the developing roller 343A to the photoconductor drum 341. This forms a toner image on the surface of the photoconductor drum 341.

Figure 2:
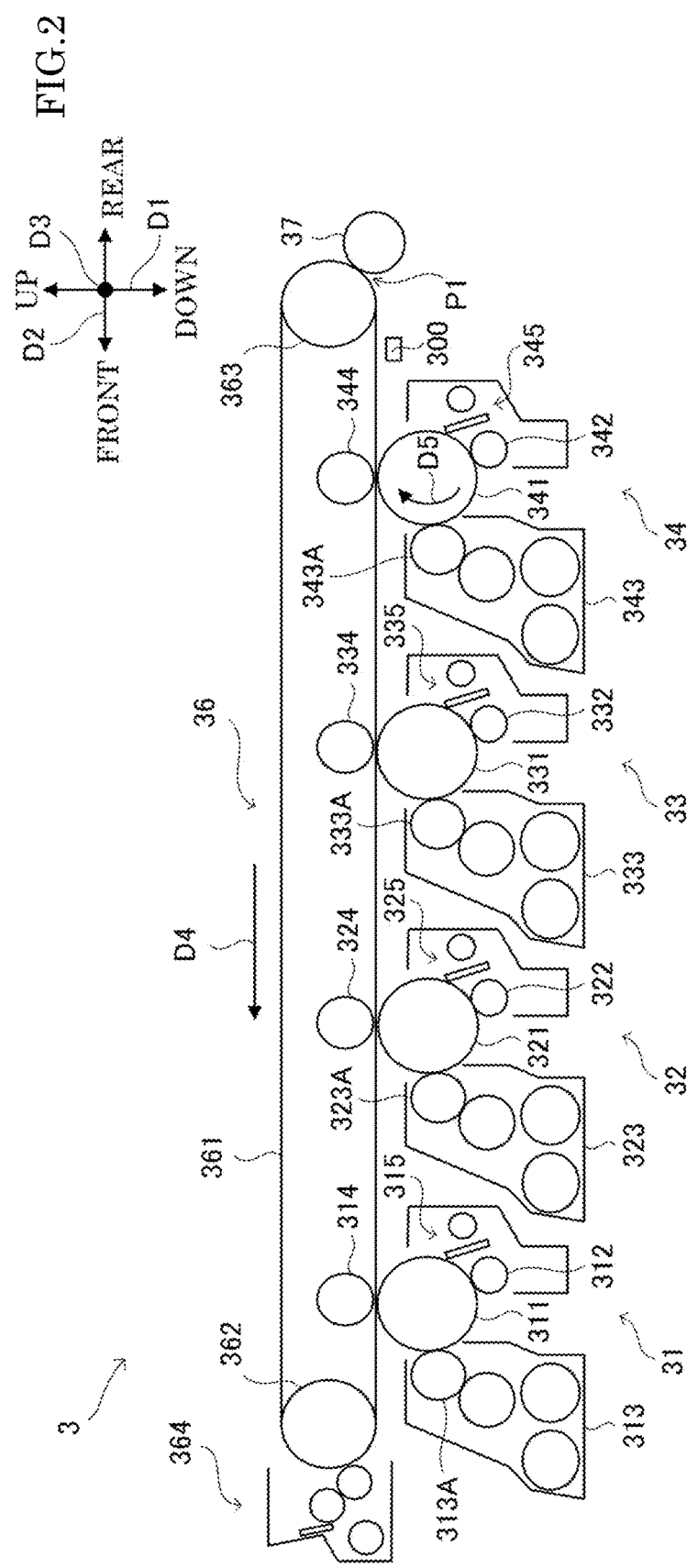
FIG. 2 is a schematic diagram of an image forming portion in the image forming apparatus according to Embodiment 1.

The primary transfer roller 344 transfers the toner image formed on the surface of the photoconductor drum 341 by the developing device 343 to the outer peripheral surface of an intermediate transfer belt 361 (see FIG. 2). Specifically, a high-voltage transfer bias is applied between the photoconductor drum 341 and the primary transfer roller 344 by the power circuit such that a transfer field is created. The transfer field causes the toner with electric charges to move from the photoconductor drum 341 to the intermediate transfer belt 361. This forms (transfers) a toner image on the outer peripheral surface of the intermediate transfer belt 361.

The drum cleaning member 345 cleans the surface of the photoconductor drum 341 after the toner image is transferred by the primary transfer roller 344. For example, the drum cleaning member 345 includes a blade-like cleaning member and a conveyance member. The cleaning member comes into contact with the surface of the photoconductor drum 341 to remove the toner adhering to the surface. The conveyance member conveys the toner removed by the cleaning member to a toner storage container.

The toner container 346 supplies toner to the case of the developing device 343. In the image forming unit 34 that forms a toner image of black (Bk), the toner container 346 supplies toner of black (Bk).

The toner images of the plurality (herein four) of colors formed by the respective image forming units 31 to 34 are superposed on the outer peripheral surface of the intermediate transfer belt 361 when transferred. This forms a color image (toner image) on the outer peripheral surface of the intermediate transfer belt 361.

As shown in FIG. 2, the intermediate transfer device 36 includes the intermediate transfer belt 361, a drive roller 362, a tension roller 363, and a belt cleaning member 364. The intermediate transfer device 36 conveys the toner image formed by the image forming units 31 to 34 to a transfer position P1 (see FIG. 2), where transfer of the toner image by the secondary transfer roller 37 is performed, using the intermediate transfer belt 361.

The intermediate transfer belt 361 is an endless belt to which the color toner images on the photoconductor drums 311, 321, 331, and 341 are transferred. As shown in FIG. 2, the intermediate transfer belt 361 is wrapped around the drive roller 362 and the tension roller 363 that are disposed away from each other in the front-rear direction D2 of the image forming apparatus 10. The drive roller 362 rotates under a driving force supplied by a motor. This causes the intermediate transfer belt 361 to rotate in a rotation direction D4 shown in FIG. 2. As the intermediate transfer belt 361 rotates, the toner image transferred to the outer peripheral surface of the intermediate transfer belt 361 is conveyed to the transfer position P1 where transfer of the toner image by the secondary transfer roller 37 is performed. The belt cleaning member 364 cleans the outer peripheral surface of the intermediate transfer belt 361 after transfer of the toner image is performed at the transfer position P1.

The secondary transfer roller 37 transfers the toner image formed on the outer peripheral surface of the intermediate transfer belt 361 to the sheet supplied by the sheet feed portion 5. As shown in FIG. 2, the secondary transfer roller 37 is placed at a position facing the tension roller 363, with the intermediate transfer belt 361 interposed therebetween, to be in contact with the outer peripheral surface of the intermediate transfer belt 361. The secondary transfer roller 37 is pressed against the tension roller 363 by a biasing member. The secondary transfer roller 37 is electrically connected to the power circuit and, when subjected to a high voltage applied by the power circuit, transfers the toner image formed on the outer peripheral surface of the intermediate transfer belt 361 to the sheet passing through the transfer position P1 where the secondary transfer roller 37 is in contact with the intermediate transfer belt 361.

The fixing device 38 fuses and fixes the toner image transferred to the sheet by the secondary transfer roller 37 onto the sheet. For example, the fixing device 38 includes a fixing roller and a pressure roller. The fixing roller is disposed to be in contact with the pressure roller and heats and fixes the toner image transferred to the sheet onto the sheet. The pressure roller pressurizes the sheet passing through the contact portion between the pressure roller and the fixing roller.

After the image formation, the sheet is discharged to the sheet discharge tray 39.

In the present embodiment, the image forming portion 3 further includes registration sensors 300 (see FIG. 2). The registration sensors 300 are optical sensors that detect patch images formed on a transfer body in the image forming portion 3. "Patch images" in the present disclosure refer to toner images used for detecting distortion or inclination of scan lines of light beams B1 to B4 (see FIG. 3) from the laser scanning unit 4. The patch images are basically not transferred to the sheet. Here, in the present embodiment, toner images are first formed on the surface of the photoconductor drum 341, transferred from the photoconductor drum 341 to the intermediate transfer belt 361, and then transferred from the intermediate transfer belt 361 to the sheet. Accordingly, the photoconductor drum 341 or the intermediate transfer belt 361 is an example of the "transfer body" on which the patch images are formed. In the present embodiment, we assume that the intermediate transfer belt 361, in particular, is the "transfer body".

Accordingly, the registration sensors 300 are placed to face the outer peripheral surface of the intermediate transfer belt 361 serving as the transfer body. Specifically, as shown in FIG. 2, the registration sensors 300 are placed downstream of the image forming unit 34 and upstream of the secondary transfer roller 37 in the rotation direction D4 of the intermediate transfer belt 361. This arrangement allows the registration sensors 300 to detect, between the image forming unit 34 and the secondary transfer roller 37, the patch images formed on the outer peripheral surface of the intermediate transfer belt 361.

[3] Configuration of Laser Scanning Unit

Next, the configuration of the laser scanning unit 4 will be described in more detail with reference to FIGS. 1, and 3 to 5.

Figure 3:
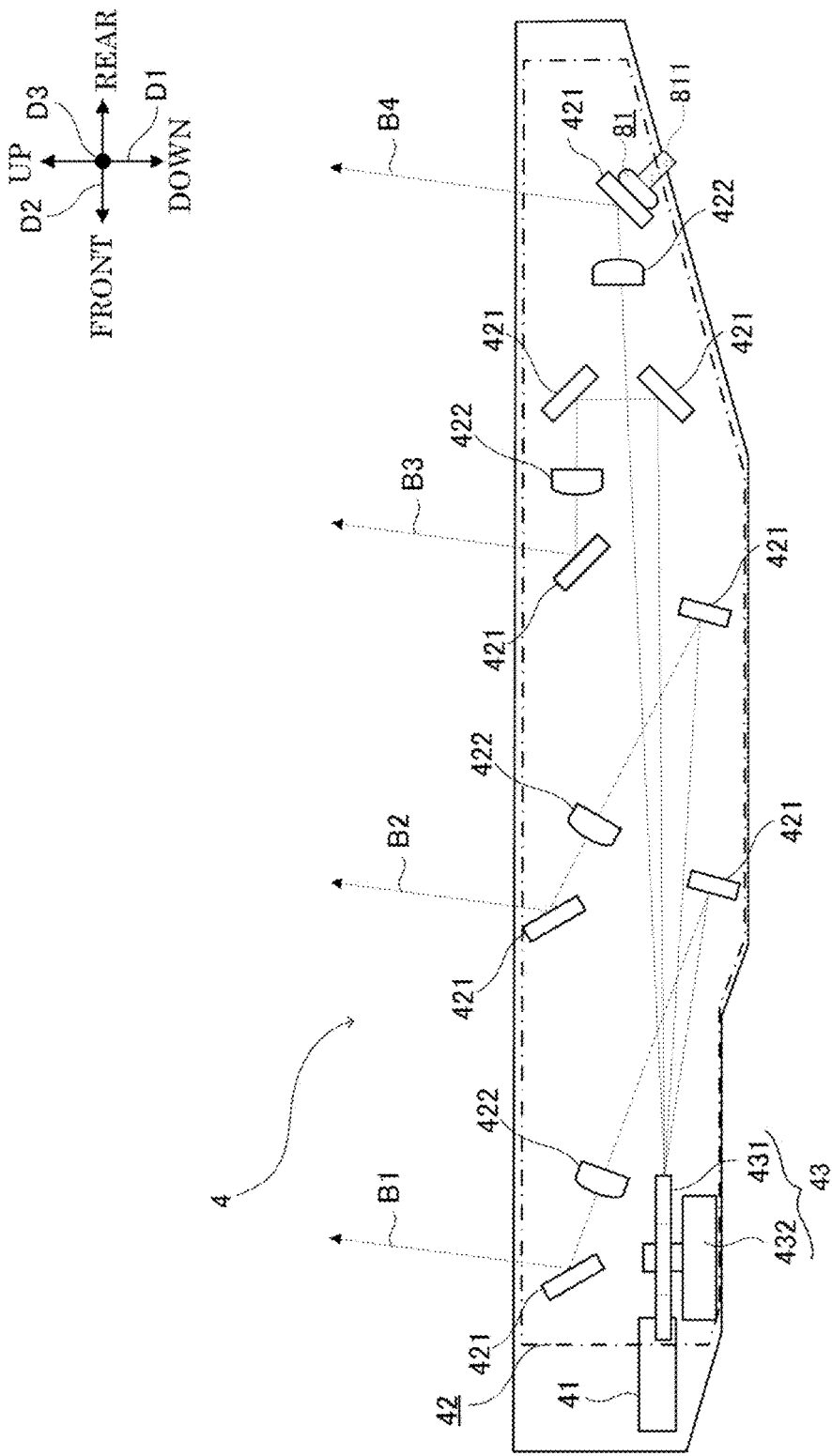
FIG. 3 is a schematic diagram of a laser scanning unit in the image forming apparatus according to Embodiment 1.

The laser scanning unit 4 forms electrostatic latent images on the photoconductor drums 311, 321, 331, and 341 in the four image forming units 31 to 34, respectively. Accordingly, as shown in FIG. 3, the laser scanning unit 4 outputs the light beams B1, B2, B3, and B4 respectively corresponding to the photoconductor drums 311, 321, 331, and 341. The light beam B1 is emitted to the photoconductor drum 311 according to an input of image data for a yellow (Y) component to form an electrostatic latent image on the photoconductor drum 311 serving as the image-carrying member. The light beam B2 is emitted to the photoconductor drum 321 according to an input of image data for a cyan (C) component to form an electrostatic latent image on the photoconductor drum 321 serving as the image-carrying member. The light beam B3 is emitted to the photoconductor drum 331 according to an input of image data for a magenta (M) component to form an electrostatic latent image on the photoconductor drum 331 serving as the image-carrying member. The light beam B4 is emitted to the photoconductor drum 341 according to an input of image data for a black (Bk) component to form an electrostatic latent image on the photoconductor drum 341 serving as the image-carrying member.

In this manner, the laser scanning unit 4 is configured to be able to output (emit) the plurality (herein four) of light beams B1 to B4 for forming electrostatic latent images to the plurality (herein four) of image forming units 31 to 34 respectively corresponding to the plurality (herein four) of colors. In the present embodiment, the plurality (herein four) of light beams B1 to B4 each traveling along an individual optical path are output from the single laser scanning unit 4. It is noted that the plurality (herein four) of light beams B1 to B4 are not necessarily output from the single laser scanning unit 4. For example, the light beams B1 and B2 may be output from a laser scanning unit 4, and the light beams B3 and B4 may be output from another laser scanning units 4.

In the present embodiment, as shown in FIG. 3, the laser scanning unit 4 includes a light source portion 41 and a scanning portion 42. The scanning portion 42 includes a deflector 43, a plurality of mirrors 421, and a plurality of scanning lenses 422. The light source portion 41 outputs the light beams B1 to B4. The scanning portion 42 scans the light beams B1 to B4 to form electrostatic latent images in the image forming portion 3. FIG. 3 is a schematic view of the configuration of the unit members and does not show the exact shapes and positional relationships of the unit members.

The light source portion 41 emits light beams to the deflector 43. In the present embodiment, the light source portion 41 includes semiconductor lasers serving as light emitting modules to output laser beams. The light source portion 41 includes the plurality (herein four) of light emitting modules and outputs laser beams from the plurality of light emitting modules to form electrostatic latent images respectively corresponding to the colors of yellow (Y), cyan (C), magenta (M), and black (Bk). That is, the light source portion 41 outputs the plurality of light beams B1 to B4.

Specifically, the light emitting modules in the light source portion 41 use semiconductor lasers (LDs: Laser Diodes) as light emitting elements. The LDs lase when electric currents are applied to the semiconductors. In the present embodiment, the light emitting modules have a multibeam structure capable of outputting a plurality of light beams. That is, each of the light emitting modules includes two or more light emitting elements composed of the semiconductor lasers in its package and can cause the plurality of light emitting elements to emit light individually. The light emitting modules with the multibeam structure enable the laser scanning unit 4 to form electrostatic latent images faster and more finely in a compatible manner.

As an example, in the present embodiment, the deflector 43 is a polygon mirror scanner and includes a polygon mirror 431 and a scanner motor 432. That is, the deflector 43 rotates the polygon mirror 431 using the scanner motor 432 and thereby scans light beams from the light source portion 41 in the main scanning direction parallel to the left-right direction D3. It is noted that, instead of the polygon scanner, the deflector 43 may be an acousto-optical element, a hologram scanner, a galvanometer mirror, a micromirror scanner using MEMS (Micro Electro Mechanical Systems) technology, or the like. In addition, the deflector 43 may be integral to the light source portion 41.

The mirrors 421 reflect light beams from the deflector 43. The scanning lenses 422 include fθ lenses. In the present embodiment, the scanning direction along which the scanning portion 42 scans the light beams B1 to B4, in other words, the main scanning direction, is parallel to the left-right direction D3. Accordingly, both the mirrors 421 and the scanning lenses 422 are elongated in the left-right direction D3 serving as the main scanning direction. With this configuration, the laser scanning unit 4 can output light beams from the light source portion 41 toward the image forming units 31 to 34 through the deflector 43, the mirrors 421, and the scanning lenses 422. Here, the laser scanning unit 4 can output the plurality (herein four) of light beams B1 to B4 and scans the light beams B1 to B4 in the main scanning direction to form electrostatic latent images corresponding to the respective colors.

In short, the light beams B1 to B4 deflected by the deflector 43 are reflected off one or more mirrors 421, while passing through one or more scanning lenses 422, and emitted toward the photoconductor drums 311, 321, 331, and 341, respectively, in the image forming portion 3. Accordingly, the mirrors 421 and the scanning lenses 422 are an example of an "optical element" located in the paths of the light beams B1 to B4 output from the light source portion 41.

In this manner, the scanning portion 42 scans the plurality (herein four) of light beams B1 to B4 output from the light source portion 41 to form the plurality (herein four) of electrostatic latent images respectively corresponding to the plurality (herein four) of colors in the image forming portion 3. That is, the plurality of light beams B1 to B4 scanned by the scanning portion 42 correspond one-to-one with the "plurality of colors". In the present embodiment, the light beam B1 corresponds to yellow (Y), the light beam B2 corresponds to cyan (C), the light beam B3 corresponds to magenta (M), and the light beam B4 corresponds to black (Bk).

The laser scanning unit 4 according to the present embodiment further includes a control portion 44 (see FIG. 4) and a storage portion. The control portion 44 controls unit portions, such as the light source portion 41 and the scanning portion 42, of the laser scanning unit 4. Specifically, the control portion 44 controls the light source portion 41 to output the light beams B1 to B4 from the light source portion 41 individually by any given amounts and at any given timings. That is, the control portion 44 turns on and off each of the plurality of light emitting modules included in the light source portion 41 at any given timings, and controls the amounts of light individually for each of the light emitting modules. The control portion 44 controls the deflector 43 (scanner motor 432) of the scanning portion 42 to scan the light beams B1 to B4 from the light source portion 41 in the scanning portion 42.

The control portion 44 is mainly composed of a computer system including one or more processors and one or more memories. In the laser scanning unit 4, the one or more processors execute programs to implement the function of the control portion 44. The programs may be stored in the memories in advance, provided through telecommunication lines such as the Internet, or stored and provided in a non-transitory computer-readable storage medium such as a memory card or an optical disk. The storage portion includes one or more nonvolatile memories and stores in advance information including control programs to cause the control portion 44 to perform various processes. The control portion 44 may be integral to the integrated control portion 7 of the image forming apparatus 10.

As a related art, there is known an electrophotographic image forming apparatus of a tandem type that includes a plurality of image forming units and that transfers images of different colors in sequence onto a recording material held on a conveyor belt. A laser scanning unit according to the related art can electrically correct inclination of scan lines relative to the main scanning direction and distortion, such as curves, of the scan lines. That is, the related art prevents misregistration of a plurality of images after transfer by detecting the inclination, distortion, and the like and by emitting light beams (light rays) by amounts and at timings that enable correction of the detected inclination, distortion, and the like.

According to the method of the related art, however, an increase in the amounts of correction (i.e., the amounts of inclination, distortion, and the like) causes a reduction in the definition of the formed images, leading to degradation of image quality.

By contrast, in the present embodiment, the laser scanning unit 4 with the configuration below causes little or no degradation of image quality regardless of an increase in the amounts of correction.

Figure 4:
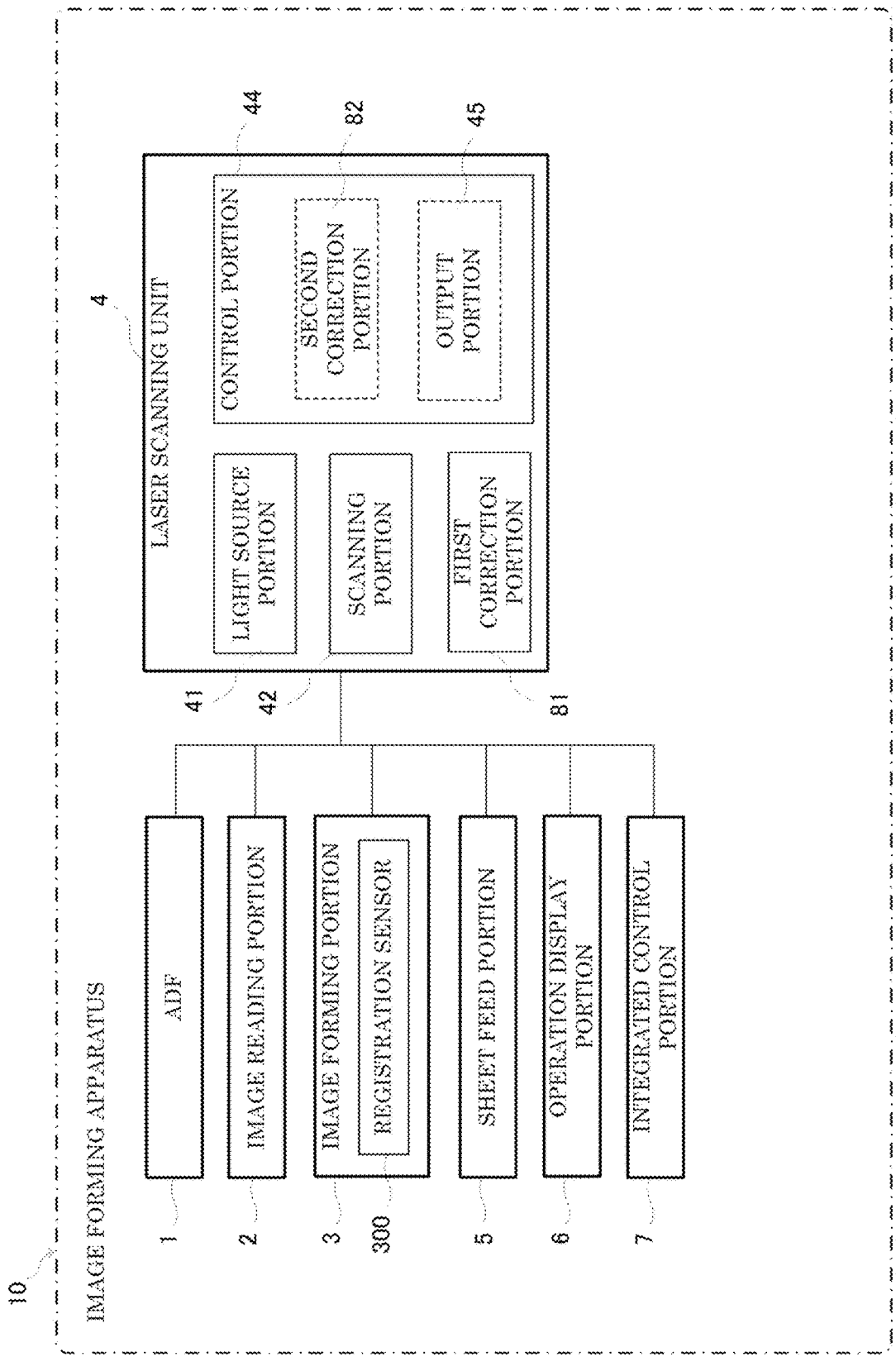
FIG. 4 is a schematic block diagram of the image forming apparatus according to Embodiment 1.

That is, as shown in FIG. 4, the laser scanning unit 4 according to the present embodiment includes a first correction portion 81 and a second correction portion 82 in addition to the light source portion 41 and the scanning portion 42. The scanning portion 42 scans the plurality of light beams B1 to B4 to form a plurality of electrostatic latent images, respectively corresponding to a plurality of colors including at least one reference color and at least one non-reference color, in the image forming portion 3. The plurality of light beams B1 to B4 include reference beams corresponding to the reference colors. The first correction portion 81 corrects distortion of scan lines of the reference beams. The plurality of light beams B1 to B4 also include non-reference beams corresponding to the non-reference colors. The second correction portion 82 corrects distortion of scan lines of the non-reference beams. As an example, in the present embodiment, the second correction portion 82 and an output portion 45 (described below) are provided for the control portion 44 as a function of the control portion 44.

"Scan lines" in the present disclosure refer to lines that occur when the light beams B1 to B4 are scanned in the main scanning direction. That is, scan lines occur on the photoconductor drums 311, 321, 331, and 341 in the four image forming units 31 to 34, respectively, as the laser scanning unit 4 scans the light beams B1 to B4 in the main scanning direction (left-right direction D3). Ideally, scan lines are straight lines parallel to the rotational axes of the photoconductor drums 311, 321, 331, and 341, that is, straight lines extending in the main scanning direction (left-right direction D3). In addition, "distortion of scan lines" in the present disclosure refers to bends (curves) of scan lines. Such bends are also called "bow". That is, the scan lines may partially shift from ideal straight lines in the sub-scanning direction (rotation direction D5 of the photoconductor drums 311, 321, 331, and 341) due to, for example, individual variations, deformations, or variations in the installation position of the "optical elements" located in the paths of the light beams B1 to B4. The first correction portion 81 and the second correction portion 82 correct such distortion of the scan lines.

In short, in the present embodiment, the "plurality of colors", which correspond one-to-one with the plurality of light beams B1 to B4 scanned in the scanning portion 42, include at least one "reference color" and at least one "non-reference color". As an example, in the present embodiment, black (Bk), among the four colors of yellow (Y), cyan (C), magenta (M), and black (Bk), serves as the "reference color"; whereas yellow (Y), magenta (M), and cyan (C) serve as the "non-reference colors". Here, the term "reference" in the reference color is simply used as a label and is not intended to limit the reference color to a color that practically works as "reference". Similarly, the term is not intended to limit the non-reference colors to colors that do not practically work as "reference".

The first correction portion 81 applies external mechanical forces to the optical elements located in the paths of reference beams to correct distortion of the scan lines of the reference beams. Here, "reference beams" refer to light beams, among the plurality of light beams B1 to B4, that correspond to the reference colors. Since the "reference color" is black (Bk) in the present embodiment, the light beam B4 corresponding to black (Bk) serves as the "reference beam". Accordingly, in the present embodiment, the first correction portion 81 is configured to be able to apply an external mechanical force to the optical elements located in the path of the reference beam (light beam B4) among the optical elements (the mirrors 421 and/or the scanning lenses 422).

Figure 5:
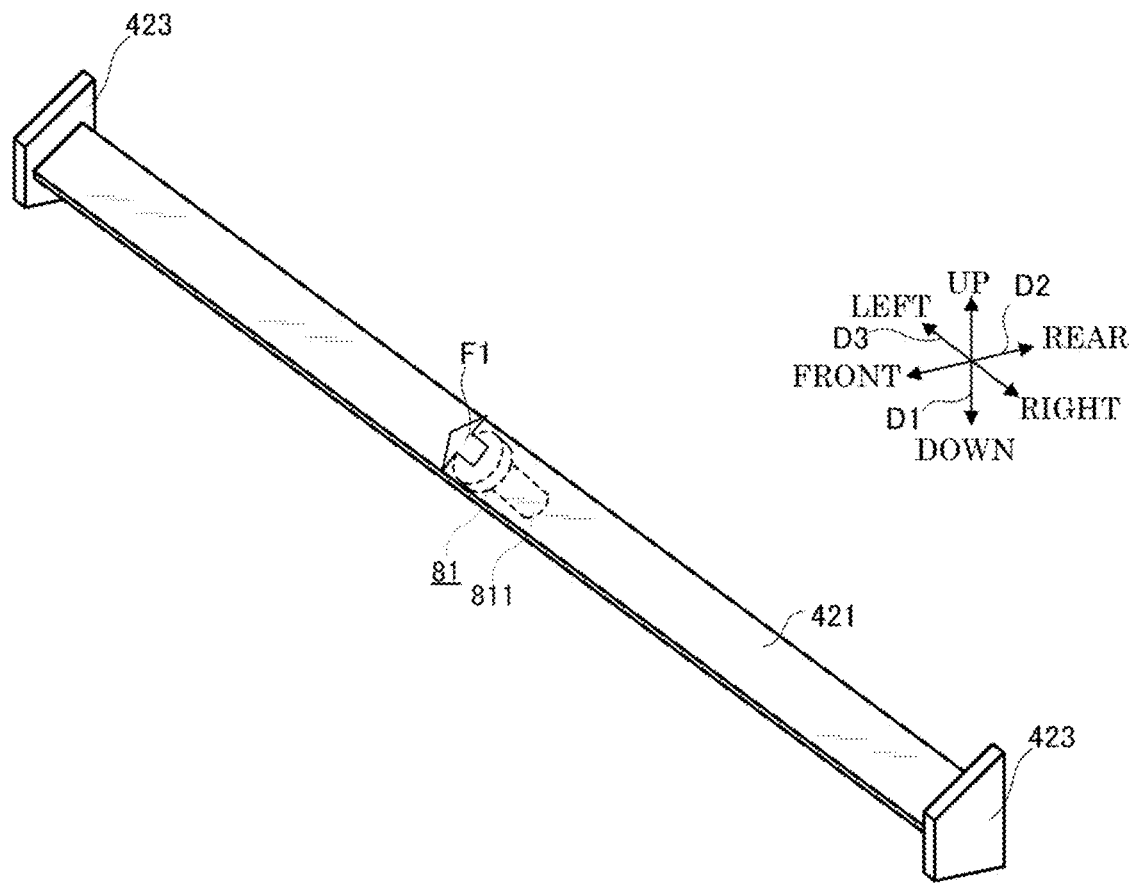
FIG. 5 is a schematic diagram of and around a first correction portion of the laser scanning unit according to Embodiment 1.

As an example, in the present embodiment, the first correction portion 81 corrects distortion of the scan line of the reference beam by applying an external mechanical force F1 (see FIG. 5) to the mirror 421 located in the path of the light beam B4 as shown in FIGS. 3 and 5. Specifically, the mirror 421 has long sides extending in the left-right direction D3 serving as the main scanning direction, and the first correction portion 81 applies the external mechanical force F1 to the middle part of the long sides (extending in the left-right direction D3) of the mirror 421 from the bottom side (obliquely from lower back) to the top side (obliquely forward and upward). Both ends of the long sides (extending in the left-right direction D3) of the mirror 421 are secured to fixed blocks 423 (see FIG. 5). As a result, the mirror 421 deforms, or warps, such that the middle part of the long sides (extending in the left-right direction D3) protrudes obliquely forward and upward according to the magnitude of the external mechanical force F1. Thus, the first correction portion 81 can partially displace the scan line of the light beam B4 in the sub-scanning direction and thereby corrects the distortion of the scan line. The first correction portion 81 is a mechanical correction portion (correction mechanism) that corrects the distortion of the scan line of the reference beam (light beam B4) reflected off the mirror 421 by deforming the mirror 421 in the above-described manner; that is, the first correction portion 81 corrects the distortion of the scan line of the reference beam by means of hardware. In the description below, correction performed by the first correction portion 81 by means of hardware is also referred to as "mechanical correction".

The second correction portion 82 controls the light source portion 41 to correct distortion of the scan lines of the non-reference beams. Here, "non-reference beams" refer to light beams, among the plurality of light beams B1 to B4, that correspond to the non-reference colors. Since the "non-reference colors" are the three colors of yellow (Y), cyan (C), and magenta (M) in the present embodiment, the light beams B1 to B3 corresponding to these three colors serve as the "non-reference beams". Accordingly, in the present embodiment, the second correction portion 82 corrects the distortion of the scan lines of the non-reference beams (light beams B1 to B3) by controlling the light source portion 41 such that the output of the non-reference beams (light beams B1 to B3) from the light source portion 41 is controlled.

As an example, in the present embodiment, the second correction portion 82 controls at least timings to output the light beams B1 to B3 or the amounts of the light beams B1 to B3 individually to correct the individual distortion of the scan lines of the light beams B1 to B3 serving as the non-reference beams. That is, the second correction portion 82 adjusts the light-on/light-off timing and/or the amount of light for the light emitting module that outputs the light beam B1 in the light source portion 41 to correct the distortion of the scan line of the light beam B1. As an example, the second correction portion 82 retards the timing to output the light beam B1 at scanning positions in the main scanning direction. This causes the scan line of the light beam B1 to be partially displaced in the sub-scanning direction at the scanning positions, enabling the distortion of the scan line of the light beam B1 to be corrected. The second correction portion 82 is an electrical correction portion that corrects the distortion of the scan lines of the non-reference beams (light beams B1 to B3) by controlling the light source portion 41 in the above-described manner; that is, the second correction portion 82 corrects the distortion of the scan lines by means of software. In the description below, correction performed by the second correction portion 82 by means of software is also referred to as "emission control correction".

In this manner, the laser scanning unit 4 according to the present embodiment corrects the distortion of the scan line of the reference beam using the mechanical correction by the first correction portion 81, and corrects the distortion of the scan lines of the non-reference beams using the emission control correction by the second correction portion 82. Thus, compared with the configuration that corrects the distortion of the scan lines by applying the emission control correction to all the plurality of light beams B1 to B4 as in the above-described related art, the configuration in the present embodiment enables the amounts of correction performed using the emission control correction to be minimized and thus prevents a reduction in the definition of the formed images. As a result, in accordance with the present embodiment, the laser scanning unit 4 causes little or no degradation of image quality regardless of an increase in the amounts of correction.

In addition, compared with the configuration that corrects the distortion of the scan lines by applying the mechanical correction to all the plurality of light beams B1 to B4, the configuration in the present embodiment requires a smaller number of mechanisms for the mechanical correction. Thus, the laser scanning unit 4 and the image forming apparatus 10 can easily be reduced in size.

The following describes the first correction portion 81 and the second correction portion 82 in more detail.

In the present embodiment, the first correction portion 81 adopts a manually operable mechanism that allows a user to adjust the magnitude of the external mechanical force F1 manually. The external mechanical force F1 can be adjusted by the first correction portion 81 even in a state where the laser scanning unit 4 is incorporated in the image forming apparatus 10. That is, the first correction portion 81 includes an adjustment portion 811 that receives operations for adjusting the external mechanical force F1. The adjustment portion 811 is at an operable position when the light source portion 41 and the scanning portion 42 are ready for use. More specifically, as shown in FIGS. 3 and 5, the first correction portion 81 includes a screw-in adjustment portion 811. Rotating the adjustment portion 811 causes the feed of the adjustment portion 811 to be adjusted, and thereby the magnitude of the external mechanical force F1 is adjusted. Here, as shown in FIG. 3, an end of the adjustment portion 811 is exposed from a housing constituting the outline of the laser scanning unit 4. In the present embodiment, in particular, the light beam B4, corresponding to the image forming unit 34 located at an end (rear end) among the four image forming units 31 to 34, serves as the reference beam. Accordingly, the adjustment portion 811 is exposed from a rear end part of the housing. Thus, the adjustment portion 811 is accessible to and operable by the user even in the state where the laser scanning unit 4 is incorporated in the image forming apparatus 10, that is, when the light source portion 41 and the scanning portion 42 are ready for use.

Here, the image forming apparatus 10 according to the present embodiment can form color images composed of images (toner images) of a plurality of colors superposed on each other. Accordingly, if the scan lines are misaligned between the plurality of light beams B1 to B4 corresponding to the respective colors, registration error occurs and leads to color slippage (misregistration) in the images formed by the image forming apparatus 10. Thus, in the present embodiment, the distortion of the scan lines is corrected by the first correction portion 81 and the second correction portion 82 to reduce the misalignment of the scan lines between the plurality of light beams B1 to B4.

That is, the second correction portion 82 corrects the distortion of the scan lines of the non-reference beams with respect to the scan line of the reference beam corrected by the first correction portion 81. Specifically, the second correction portion 82 corrects the distortion of the scan lines of the non-reference beams (light beams B1 to B3) such that the scan lines of the non-reference beams (light beams B1 to B3) approach the scan line of the reference beam (light beam B4) corrected by the first correction portion 81. This reduces the misalignment of the scan lines between the plurality of light beams B1 to B4 in the laser scanning unit 4 and thereby reduces the color slippage (misregistration) in the images formed by the image forming apparatus 10.

In addition, in the present embodiment, the first correction portion 81 corrects the distortion of the scan line of the reference beam such that the amounts of correction performed by the second correction portion 82 satisfy predetermined conditions. "Predetermined conditions" here are those imposed on the amounts of correction performed by the second correction portion 82, and include, for example, a condition that the maximum values of the amounts of correction applied to each of the non-reference beams (light beams B1 to B3) at each main scanning position be minimized. For another example, the "predetermined conditions" may include a condition that the peak-to-peak values of the amounts of correction applied to each of the non-reference beams (light beams B1 to B3) at each main scanning position be minimized. That is, the amount of correction by the first correction portion 81 (magnitude of the external mechanical force F1) is determined such that the amounts of correction by the second correction portion 82 satisfy the predetermined conditions. Thus, in the laser scanning unit 4, the amounts of correction applied to the scan lines of the non-reference beams (light beams B1 to B3) by the second correction portion 82 using emission control correction can easily be minimized.

In addition, the output portion 45 outputs evaluation information representing the misalignment between the scan line of the reference beam and the scan lines of the non-reference beams. As an example, in the present embodiment, the output portion 45 causes the image forming apparatus 10 to form an image of a chart G1 (see FIG. 7) reflecting the evaluation information to output the evaluation information. The output portion 45 does not necessarily form the image of the chart G1 to output the evaluation information, and may, for example, display the evaluation information in the display portion, transmit the evaluation information to the external apparatus, or write the evaluation information in a non-transitory computer-readable storage medium. Thus, in the laser scanning unit 4, the first correction portion 81 or the second correction portion 82 can easily perform correction to, for example, reduce the misalignment between the scan line of the reference beam and the scan lines of the non-reference beams.

[4] Laser Scanning Method

Figure 6:
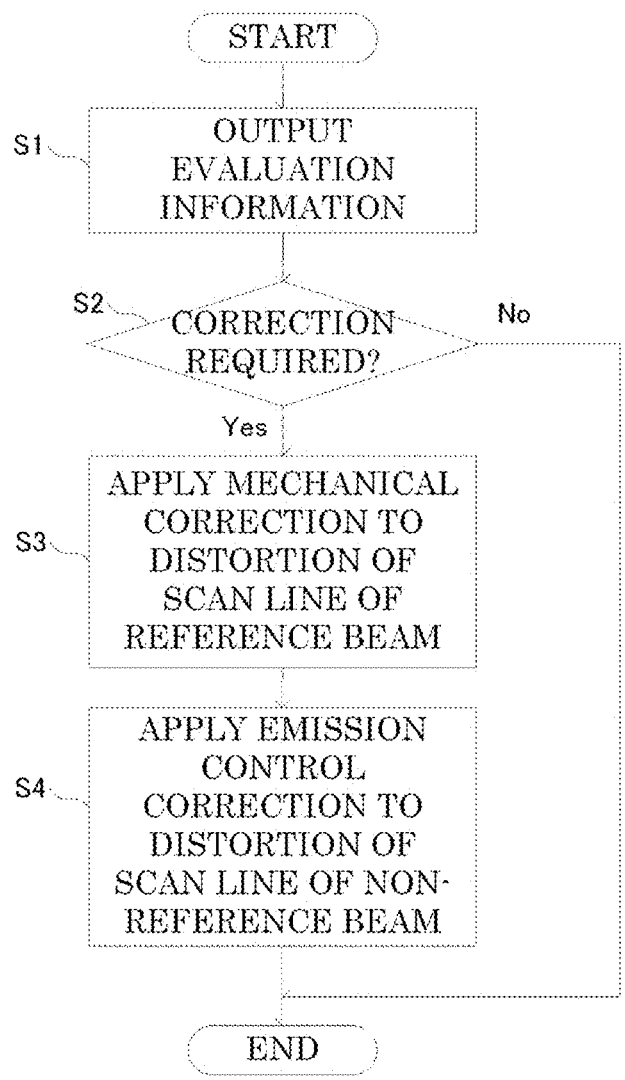
FIG. 6 is a flowchart showing an example of a laser scanning method according to Embodiment 1.

Next, a laser scanning method, which is an operation of the laser scanning unit 4 according to the present embodiment, will be described with reference to FIGS. 6 to 9. Here, steps S1, S2, . . . in FIG. 6 represent the numbers of processing procedures (steps) performed by the laser scanning unit 4. The laser scanning method is performed when an instruction to implement a predetermined calibration is input during, for example, initialization of the image forming apparatus 10. In addition, although black (Bk) serves as the reference color in the laser scanning method described below, the laser scanning unit 4 performs similar processes even in a case where yellow (Y), cyan (C), or magenta (M) serves as the reference color.

<Step S1>

Figure 7:
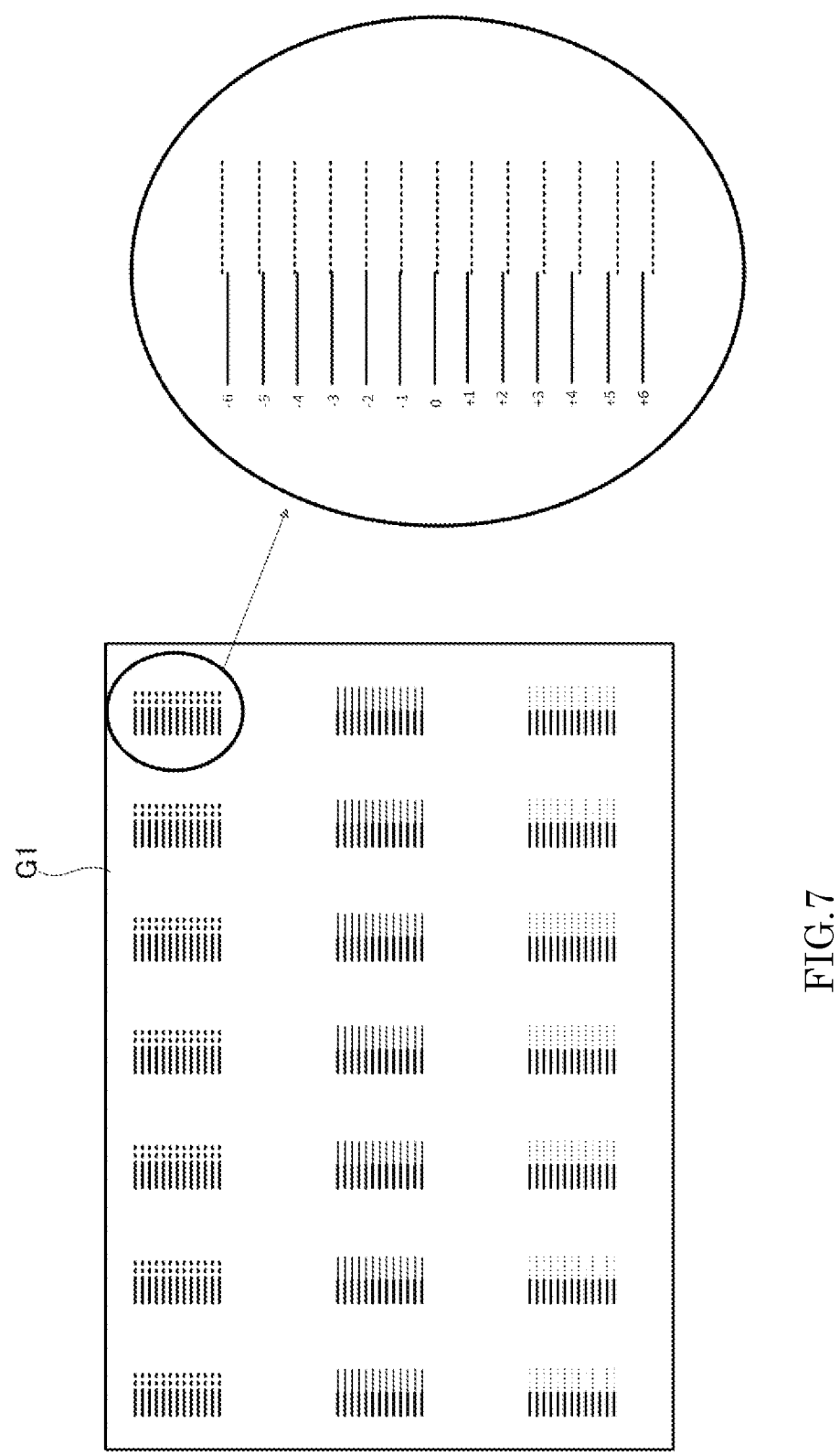
FIG. 7 is a conceptual diagram of a chart obtained using the laser scanning unit according to Embodiment 1.

First, in step S1, the laser scanning unit 4 causes the image forming apparatus 10 to form the image of the chart G1 reflecting the evaluation information in the output portion 45 (control portion 44). The chart G1 shown in FIG. 7 is an example of a chart for visual check. The chart has a plurality of horizontal lines of each color drawn at regular intervals. In the chart G1, the horizontal lines of black (Bk) serving as the reference color and the horizontal lines of yellow (Y), cyan (C), and magenta (M) serving as the non-reference colors are drawn side-by-side in pairs. The relative positions of the paired horizontal lines correspond to the evaluation information. In the example in FIG. 7, as shown in a partially enlarged view, the horizontal line of magenta (M; indicated by a dotted line) at a position of "−2" matches the paired horizontal line of black (Bk). This indicates that the scan line of magenta (M) is misaligned from the scan line of black (Bk) by a unit of "−2". The chart G1 allows the user to visually check the amounts of misalignment.

It is noted that FIG. 7 is only an example of the chart G1, and the output portion 45 may output, for example, a chart to be read by a scanner instead of the chart for visual check. In this case, the chart is read by the image reading portion 2 so that the control portion 44 can automatically calculate the amounts of misalignment.

<Step S2>

In step S2, it is determined whether or not distortion correction to the scan lines is required. That is, in a case where distortion correction to the scan lines is required (Yes in step S2), the laser scanning unit 4 moves the process to step S3. In a case where distortion correction to the scan lines is not required (No in step S2), the laser scanning unit 4 bypasses steps S3 and S4 and ends the series of processes. Here, in a case where the chart G1 for visual check is used, a user (human) determines whether or not distortion correction to the scan lines is required, and inputs the determination result in the operation display portion 6. In a case where a chart to be read by a scanner is used, the control portion 44 determines whether or not distortion correction to the scan lines is required.

<Step S3>

In step S3, the first correction portion 81 corrects the distortion of the scan line of the reference beam (light beam B4) using the mechanical correction. In the present embodiment, the first correction portion 81 is manually operated. Thus, the user operates the adjustment portion 811 to perform the mechanical correction. At this moment, the amount of correction by the first correction portion 81, that is, the magnitude of the external mechanical force F1 is determined such that the amounts of correction by the second correction portion 82 satisfy a predetermined condition. Here, as an example, the amount of correction by the first correction portion 81 is determined to satisfy a predetermined condition that the maximum values of the amounts of correction applied to each of the non-reference beams (light beams B1 to B3) at each main scanning position be minimized.

The amount of correction by the first correction portion 81 satisfying the predetermined condition can be calculated based on, for example, the evaluation information (the chart G1 as an example) output by the output portion 45. Alternatively, the amount of correction by the first correction portion 81 may be calculated based on the output from the registration sensors 300 that detect the patch images formed on the transfer body (intermediate transfer belt 361) in the image forming portion 3. In this case, the amount of correction by the first correction portion 81 can also be automatically calculated.

<Step S4>

In step S4, the second correction portion 82 corrects the distortion of the scan lines of the non-reference beams (light beams B1 to B3) using the emission control correction. That is, the second correction portion 82 controls the timings to output the light beams B1 to B3 and/or the amounts of the light beams B1 to B3 individually to correct the individual distortion of the scan lines of the light beams B1 to B3 serving as the non-reference beams. At this moment, the amounts of correction by the second correction portion 82 are determined such that the scan lines of the non-reference beams (light beams B1 to B3) approach the scan line of the reference beam (light beam B4) corrected by the first correction portion 81.

The procedure of the laser scanning method described above is only an example, and the order of the processes shown in the flowchart in FIG. 6 may be changed as appropriate, or another process may be added.

Figure 8:
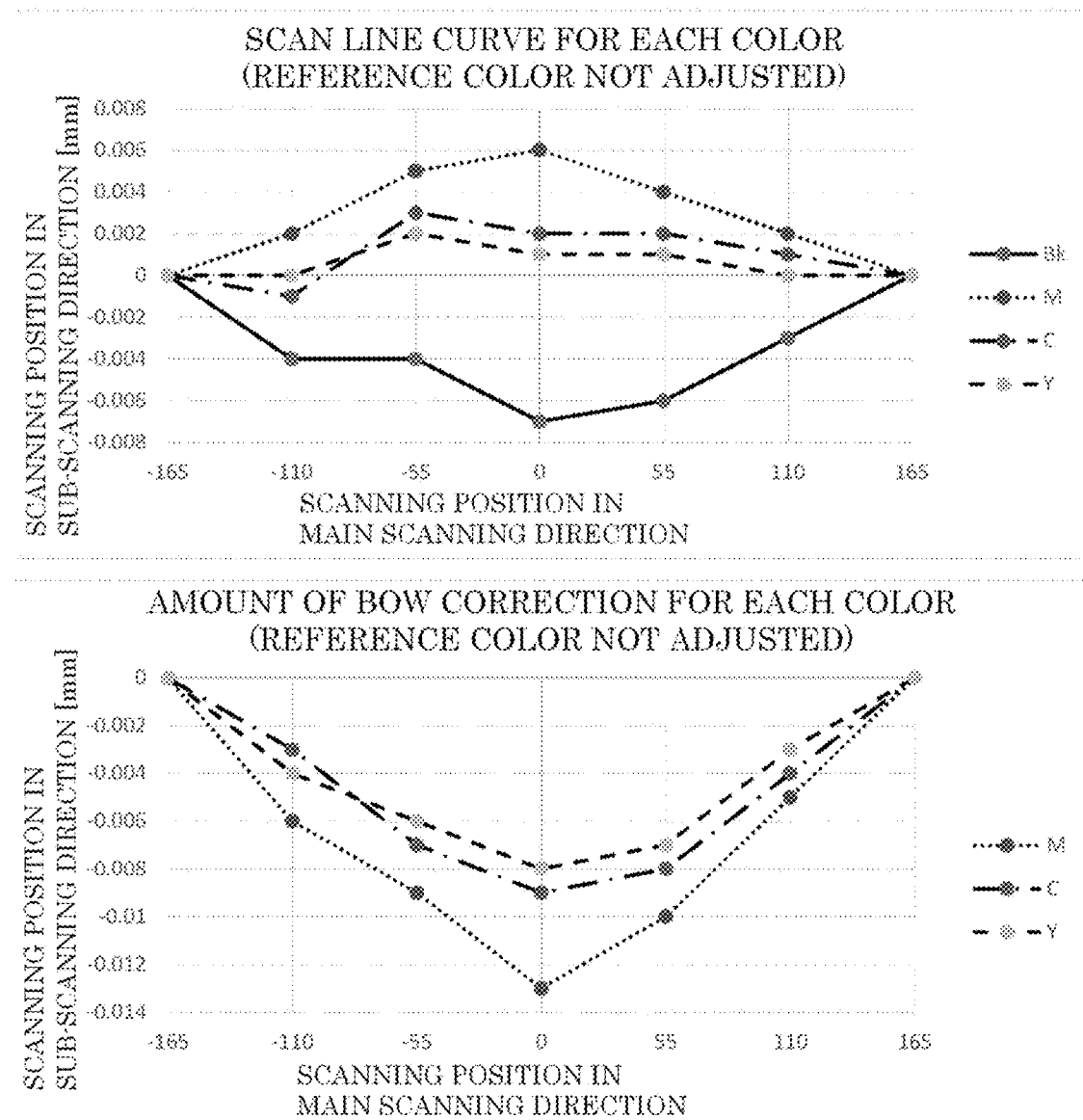
FIG. 8 is a graph showing a comparative example of Embodiment 1.
Figure 9:
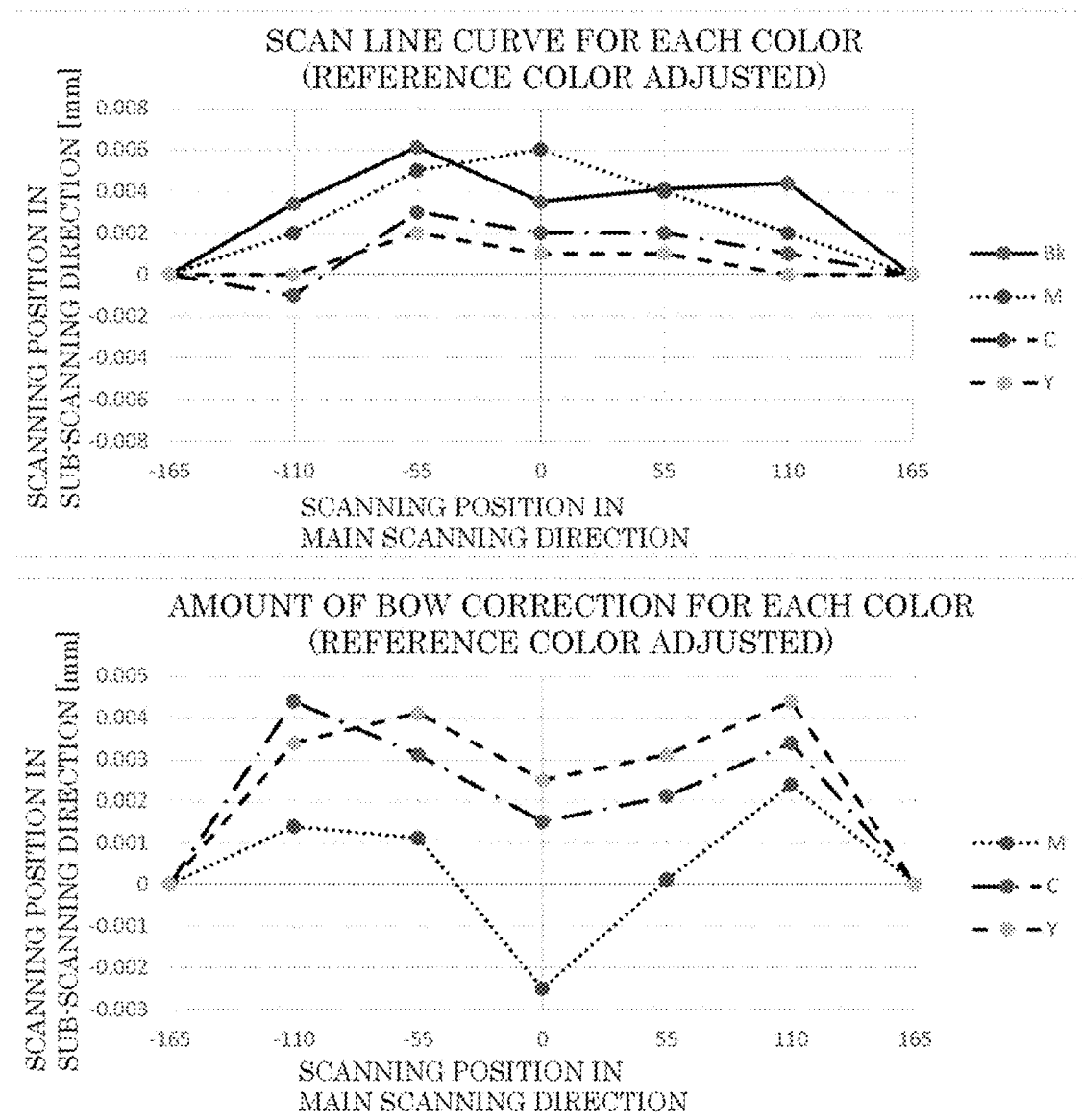
FIG. 9 is a graph showing an example of effects produced by the laser scanning unit according to Embodiment 1.

Next, effects that the laser scanning unit 4 according to the present embodiment is expected to produce will be described with reference to FIGS. 8 and 9. In FIGS. 8 and 9, graphs at the top show the amounts of distortion of the scan lines for each of the light beams B1 to B4 corresponding to the respective colors, and graphs at the bottom show the amounts of correction applied to each of the light beams B1 to B3 corresponding to the non-reference colors. In each graph, the horizontal axis represents the scanning position in the main scanning direction, and the vertical axis represents the scanning position in the sub-scanning direction. It is assumed that the amounts of distortion of the scan lines of the light beams B1 to B3 corresponding to the non-reference colors in FIG. 8 are identical to those in FIG. 9 and that the scan lines of the light beams B1 to B3 corresponding to the non-reference colors are corrected to approach the scan line of the light beam B4 corresponding to the reference color. FIG. 8 shows the amounts of distortion correction to the scan lines of the non-reference beams (light beams B1 to B3) in a case where the distortion of the scan line of the reference beam (light beam B4) is not corrected using the mechanical correction. FIG. 9 shows the amounts of distortion correction to the scan lines of the non-reference beams (light beams B1 to B3) in the case where the distortion of the scan line of the reference beam (light beam B4) is corrected using the mechanical correction. Here, it is assumed that the scan lines do not have any inclination (skew) components.

That is, in the case where the first correction portion 81 does not apply the mechanical correction to the scan line of the reference beam (light beam B4) corresponding to the reference color (Bk), the amounts of correction applied to the scan lines of the light beams B1 to B3 corresponding to the non-reference colors are relatively large as shown at the bottom of FIG. 8. That is, to bring the scan lines of the light beams B1 to B3 corresponding to the non-reference colors closer to the scan line of the light beam B4 corresponding to the reference color in the graph at the top of FIG. 8, the scan lines of the light beams B1 to B3 corresponding to the non-reference colors need to be corrected relatively on a large scale as shown at the bottom of FIG. 8. The maximum value of the amount of correction performed using the emission control correction in this case is "−0.013 mm" for magenta (M) at the scanning position of "0" in the main scanning direction.

By contrast, in the case where the first correction portion 81 applies the mechanical correction to the scan line of the reference beam (light beam B4) corresponding to the reference color (Bk) as in the present embodiment, the amounts of correction applied to the scan lines of the light beams B1 to B3 corresponding to the non-reference colors can be reduced as shown at the bottom of FIG. 9. Here, the amount of correction applied to the scan line of the reference beam (light beam B4) by the first correction portion 81 is determined to satisfy a predetermined condition that the maximum values of the amounts of correction applied to each of the non-reference beams (light beams B1 to B3) at each main scanning position be minimized. Specifically, the distortion of the scan line of the reference beam is corrected such that, in the middle (scanning position of "0") in the main scanning direction, the scanning position of the reference beam in the sub-scanning direction has an intermediate value between the maximum value (0.006 mm) and the minimum value (0.001 mm) of the scanning positions of the three non-reference beams in the sub-scanning direction.

In this case, to bring the scan lines of the light beams B1 to B3 corresponding to the non-reference colors closer to the scan line of the light beam B4 corresponding to the reference color in the graph at the top of FIG. 9, the scan lines of the light beams B1 to B3 corresponding to the non-reference colors are corrected as shown at the bottom of FIG. 9. The maximum value of the amount of correction performed using the emission control correction in this case is "0.0045 mm" for cyan (C) at the scanning position of "−110" or for yellow (Y) at the scanning position of "110" in the main scanning direction. Thus, in the case where the mechanical correction is applied to the scan line of the reference beam (light beam B4) as in the present embodiment, the amounts of correction applied to the non-reference beams (light beams B1 to B3) using the emission control correction are reduced compared with the case where the mechanical correction is not performed. This results in little or no degradation of image quality.

[5] Modification

The plurality of components included in the image forming apparatus 10 may be dispersedly provided for a plurality of housings. For example, the image reading portion 2 and the image forming portion 3 may be provided for different housings.

In addition, in Embodiment 1, black (Bk) serves as the "reference color", whereas yellow (Y), cyan (C), and magenta (M) serve as the "non-reference colors". However, this may not always be the case. For example, any one of yellow (Y), cyan (C), and magenta (M) may serve as the "reference color", and black (Bk) may serve as the "non-reference color". Furthermore, the plurality of colors need to include at least one reference color and at least one non-reference color and may include two or more reference colors and/or non-reference colors. For example, two colors of black (Bk) and yellow (Y) may serve as the reference colors, whereas two colors of cyan (C) and magenta (M) may serve as the non-reference colors. Furthermore, although the four colors of Y, C, M, and Bk are used in Embodiment 1, colors other than these may be used.

In addition, instead of the manually operable type, the first correction portion 81 may be of an electrically driven type that generates the external mechanical force F1 using, for example, an actuator that generates power based on electrical signals. In this case, even when the first correction portion 81 is not accessible to the user, the first correction portion 81 can perform the mechanical correction according to the operations on, for example, the operation display portion 6. Furthermore, in addition to or instead of the function of deforming the optical elements, the first correction portion 81 may have the function of displacing the optical elements by applying the external mechanical force F1 to the optical elements. For example, the mechanical correction can be implemented by applying the external mechanical force F1 to the optical elements and to move the optical elements in a parallel manner.

Embodiment 2

Figure 10:
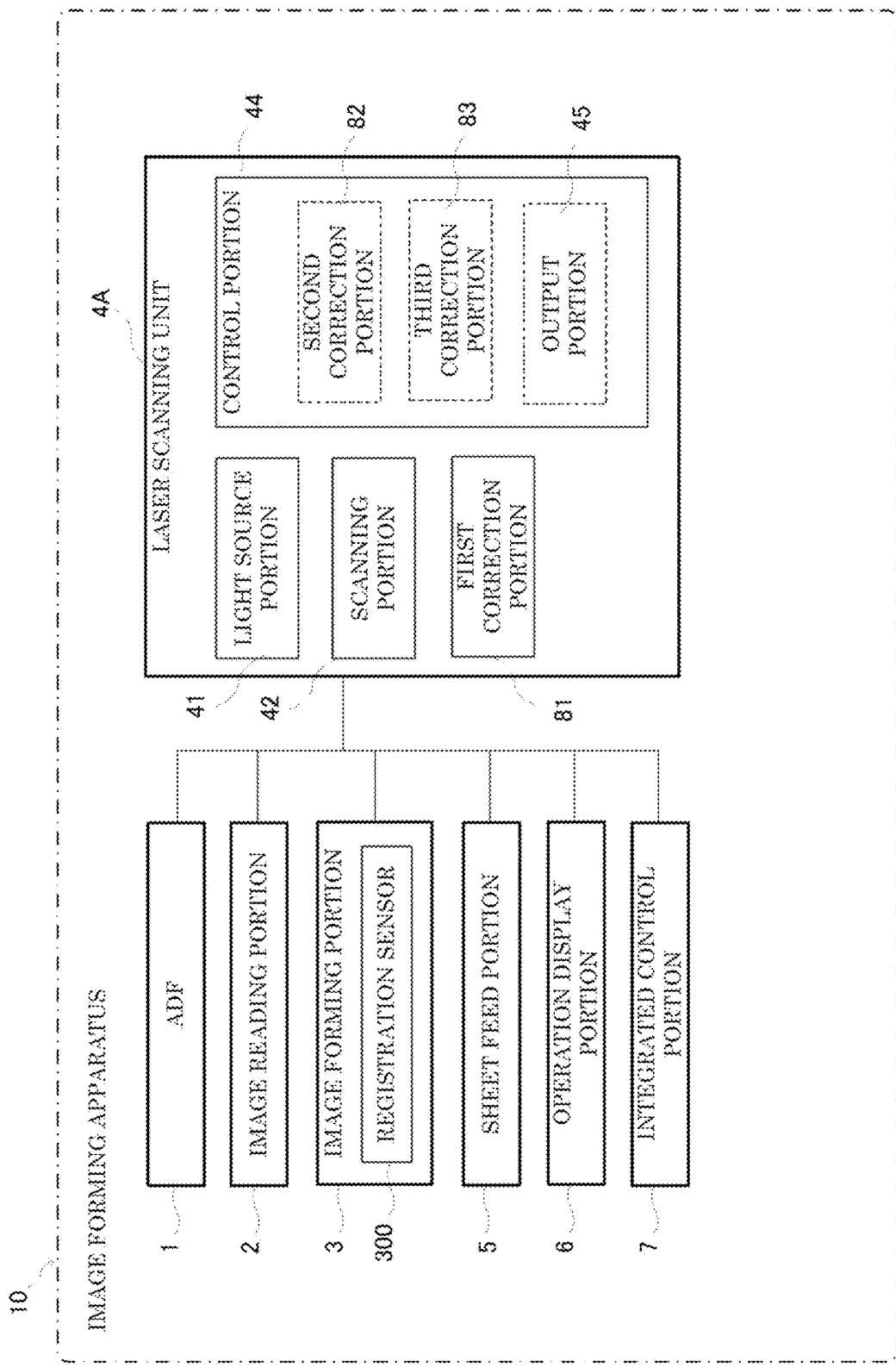
FIG. 10 is a schematic block diagram of an image forming apparatus according to Embodiment 2.

As shown in FIG. 10, the image forming apparatus 10 according to the present embodiment differs from the image forming apparatus 10 according to Embodiment 1 in that a laser scanning unit 4A includes a third correction portion 83. In the description below, common reference numbers and symbols are used for components identical to those in Embodiment 1, and the detailed descriptions will be omitted.

The third correction portion 83 controls the light source portion 41 to correct the distortion of the scan line of the reference beam. As an example, in the present embodiment, the third correction portion 83 is provided for the control portion 44 as a function of the control portion 44. The third correction portion 83 corrects the distortion of the scan line of the reference beam (light beam B4) using the emission control correction as does the second correction portion 82. That is, the third correction portion 83 controls at least the timing to output the light beam B4 or the amount of the light beam B4 to correct the distortion of the scan line of the light beam B4 serving as the reference beam. The emission control correction allows local correction in the main scanning direction unlike the mechanical correction. Thus, the laser scanning unit 4A, which includes the third correction portion 83, can further reduce the amounts of correction performed using the emission control correction.

Figure 11:
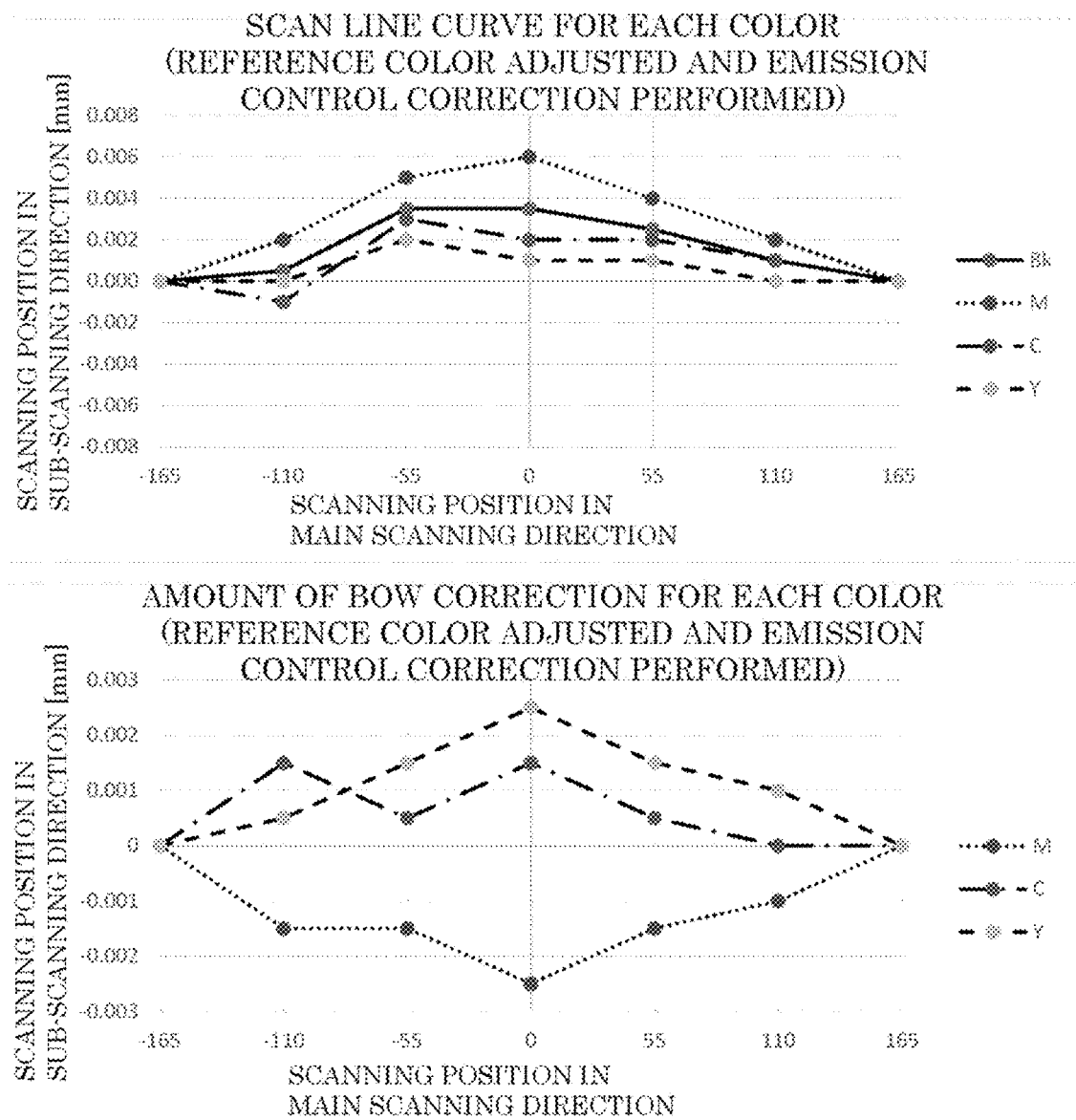
FIG. 11 is a graph showing an example of effects produced by the laser scanning unit according to Embodiment 2.

Next, effects that the laser scanning unit 4A according to the present embodiment is expected to produce will be described with reference to FIG. 11. In FIG. 11, as in FIGS. 8 and 9, a graph at the top shows the amounts of distortion of the scan lines for each of the light beams B1 to B4 corresponding to the respective colors, and a graph at the bottom shows the amounts of correction applied to each of the light beams B1 to B3 corresponding to the non-reference colors. It is assumed that the amounts of distortion of the scan lines of the light beams B1 to B3 corresponding to the non-reference colors in FIG. 11 are identical to those in FIG. 9 and that the scan lines of the light beams B1 to B3 corresponding to the non-reference colors are corrected to approach the scan line of the light beam B4 corresponding to the reference color.

That is, in the case where the reference beam (light beam B4) is subjected to the emission control correction by the third correction portion 83 in addition to the mechanical correction by the first correction portion 81 as in the present embodiment, the amounts of correction applied to the scan lines of the light beams B1 to B3 can be further reduced as shown at the bottom of FIG. 11. The maximum value of the amount of correction applied to the scan lines of the light beams B1 to B3 using the emission control correction in this case is "0.0025 mm" for yellow (Y) or "−0.0025 mm" for magenta (M) at the scanning position of "0" in the main scanning direction. Thus, the emission control correction applied to the scan line of the reference beam (light beam B4) as in the present embodiment further reduces the amounts of correction applied to the non-reference beams (light beams B1 to B3) using the emission control correction, resulting in little or no degradation of image quality.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A laser scanning unit comprising:
   a light source portion outputting a plurality of light beams;
   a scanning portion configured to scan the plurality of light beams to form a plurality of electrostatic latent images, respectively corresponding to a plurality of colors including at least one reference color and at least one non-reference color, in an image forming portion;
   a first correction portion configured to apply an external mechanical force to an optical element located in a path of a reference beam, corresponding to the reference color, among the plurality of light beams to correct distortion of a scan line of the reference beam; and
   a second correction portion configured to control the light source portion to correct distortion of a scan line of a non-reference beam, corresponding to the non-reference color, among the plurality of light beams.

2. The laser scanning unit according to claim 1, wherein
   the first correction portion includes an adjustment portion configured to receive an operation for adjusting the external mechanical force; and
   the adjustment portion is at an operable position when the light source portion and the scanning portion are ready for use.

3. The laser scanning unit according to claim 1, wherein
   the first correction portion corrects the distortion of the scan line of the reference beam such that an amount of correction performed by the second correction portion satisfies a predetermined condition.

4. The laser scanning unit according to claim 1, wherein
   the second correction portion corrects the distortion of the scan line of the non-reference beam with respect to the scan line of the reference beam corrected by the first correction portion.

5. The laser scanning unit according to claim 1, further comprising:
   an output portion configured to output evaluation information representing misalignment between the scan line of the reference beam and the scan line of the non-reference beam.

6. The laser scanning unit according to claim 1, further comprising:

a third correction portion configured to control the light source portion to correct the distortion of the scan line of the reference beam.

7. An image forming apparatus comprising:

the laser scanning unit according to claim 1; and image-carrying members on which the electrostatic latent images are formed by the light beams output from the laser scanning unit.

8. A laser scanning method comprising:

outputting a plurality of light beams from a light source portion;

scanning the plurality of light beams to form a plurality of electrostatic latent images, respectively corresponding to a plurality of colors including at least one reference color and at least one non-reference color, in an image forming portion;

applying an external mechanical force to an optical element located in a path of a reference beam, corresponding to the reference color, among the plurality of light beams to correct distortion of a scan line of the reference beam; and controlling the light source portion to correct distortion of a scan line of a non-reference beam, corresponding to the non-reference color, among the plurality of light beams.

9. A non-transitory computer-readable storage medium storing a program therein, wherein when executed by at least one processor, the program causes the processor to:

output a plurality of light beams from a light source portion;

scan the plurality of light beams to form a plurality of electrostatic latent images, respectively corresponding to a plurality of colors including at least one reference color and at least one non-reference color, in an image forming portion;

apply an external mechanical force to an optical element located in a path of a reference beam, corresponding to the reference color, among the plurality of light beams to correct distortion of a scan line of the reference beam; and control the light source portion to correct distortion of a scan line of a non-reference beam, corresponding to the non-reference color, among the plurality of light beams.

* * * * *